United States Patent [19]

Modesitt

[11] Patent Number: 5,046,773
[45] Date of Patent: Sep. 10, 1991

[54] MICRO-GRIPPER ASSEMBLY
[75] Inventor: D. Bruce Modesitt, San Carlos, Calif.
[73] Assignee: Hewlett-Packard Company, Palo Alto, Calif.
[21] Appl. No.: 459,928
[22] Filed: Jan. 2, 1990
[51] Int. Cl.$^5$ .......................... B66C 1/42; B25J 19/02
[52] U.S. Cl. ..................................... 294/100; 294/88; 294/907; 901/33; 901/47
[58] Field of Search ..................... 294/99.1, 99.2, 100, 294/88, 907; 901/30, 31, 32, 33, 34, 46, 47

[56] References Cited
U.S. PATENT DOCUMENTS

| | | | |
|---|---|---|---|
| 4,351,553 | 9/1982 | Rovetta et al. | 901/34 X |
| 4,540,211 | 9/1985 | Masserang | 294/99.1 X |
| 4,610,475 | 9/1986 | Heiserman | 294/86.4 |
| 4,666,198 | 5/1987 | Heiserman | 294/86.4 |
| 4,667,997 | 5/1987 | Udagawa et al. | 294/99.1 X |
| 4,801,791 | 1/1989 | Cain | 250/201 |
| 4,808,898 | 2/1989 | Pearson | 318/568 |
| 4,872,803 | 10/1989 | Asakawa | 294/99.1 X |

OTHER PUBLICATIONS

John P. Dakin, *Optical Fiber Sensors–Principles and Applications*, SPIE, vol. 374, Apr. 19–21, 1983, pp. 172–182.
H. Kopola et al., *Intensity Modulated Fiber Optic Sensors for Robotic Feedback Control in Precision Assembly*, SPIE, vol. 798, Fiber Optic Sensors II (1987), pp. 166–175.
Du Zhongren, *The Robot's Nerve: Optical Fiber Sensors*, SPIE, vol. 798, Fiber Optic Sensors II (1987), pp. 307–310.
M. Elwenspoek et al., *Transduction Mechanisms and Their Applications in Micromechanical Devices*, IEEE, Mar. 1989, pp. 126–132.

Primary Examiner—Margaret A. Focarino
Assistant Examiner—Dean J. Kramer

[57] ABSTRACT

A tactile micro-gripper is disclosed having a combined lever and spring linkage. The lever flexes at predetermined points and is coupled to the spring and to an actuator. The spring is of a parallelogram type, so that the ends remain parallel to one another when the spring is bent. When the actuator causes the lever to move transversely, the end of the spring is caused to move laterally in a parallel manner. A pair of lever and spring linkages are arranged together so that they cooperatively act together to manipulate a pair of fingers, which are attached to the ends of the springs, to grip and release objects. Tactile sensing is accomplished by means of a cantilever beam and an optical detection system disposed in the tip of the fingers.

15 Claims, 3 Drawing Sheets

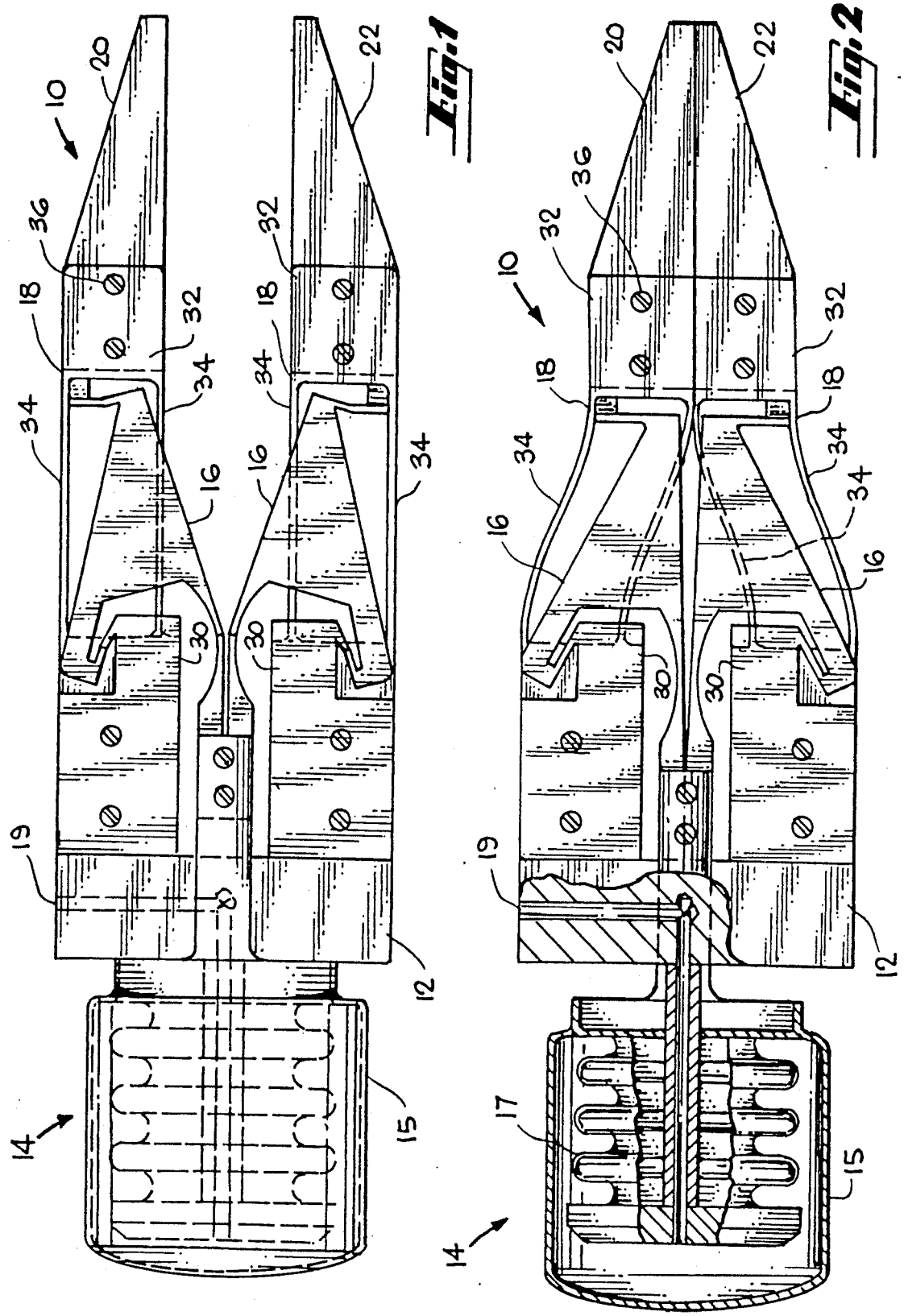

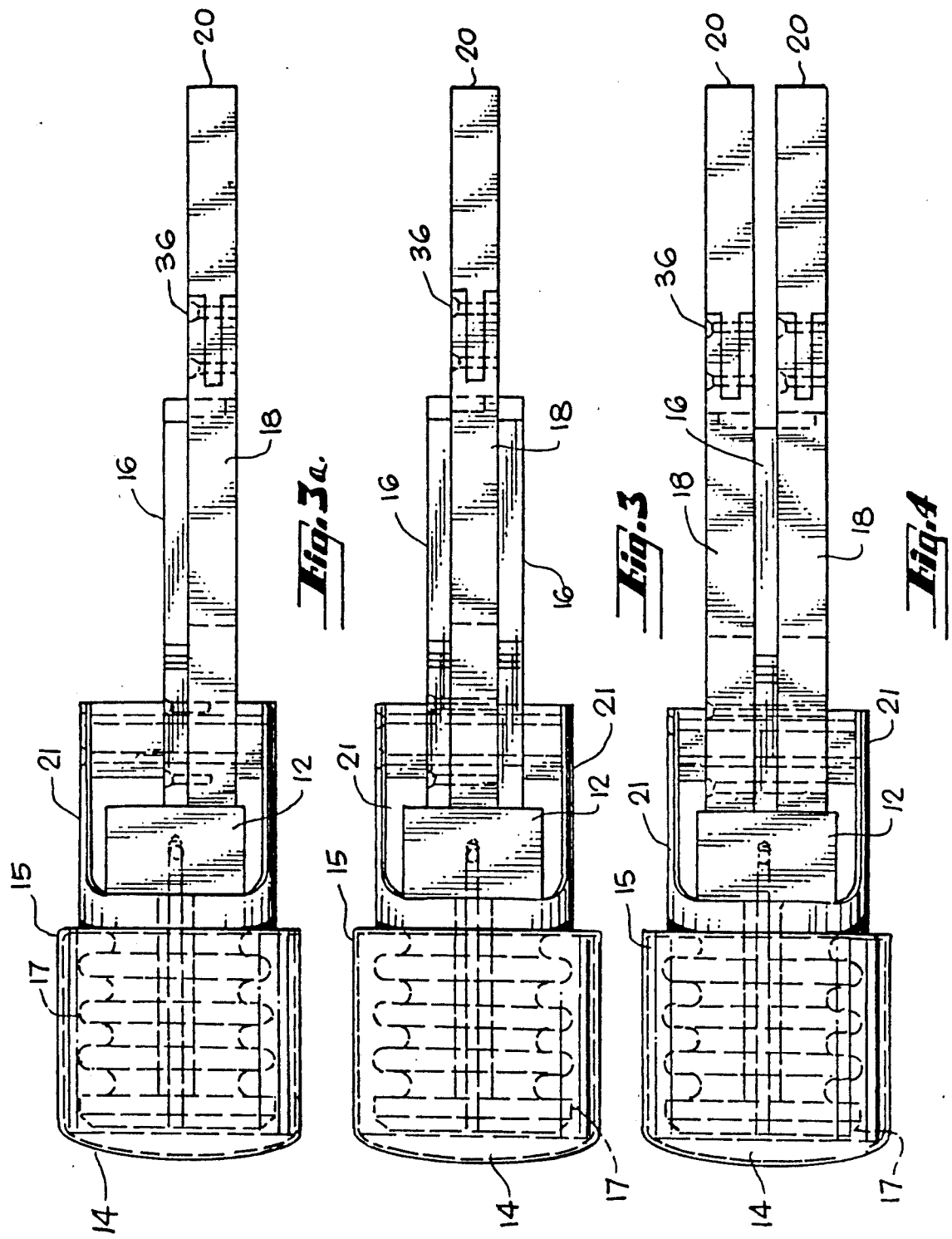

MICRO-GRIPPER ASSEMBLY

DESCRIPTION

1. Technical Field

The present invention relates to robotic grippers and more particularly to grippers used to manipulate small objects.

2. Background Art

Robotic manipulators are becoming increasingly important in the fields of manufacturing and material transport in extreme environments. In particular, robotics are being used increasingly for very delicate procedures involving manipulation of small objects. Uses include micro-electronic component testing and manufacture, biomedical procedures, and micro-surgery. These uses require sensitive, yet highly reliable manipulators.

Various devices and mechanisms have been designed for gripping objects for use with robotic arms and the like. Generally, these devices fall within several types of designs. Of particular interest are manipulators for small objects where robotic fingers handle the object. One type has a pair of fingers which are caused to move in parallel paths or in arcuate paths. Designs of this type, however, suffer from a loss of tactile sensitivity because of static friction. A second type of design is based on a tweezers type mechanism. Designs of this type eliminate some of the problems associated with static friction, but require long arms to provide near parallel movement of the tips. Precise control of the long arms and tips can prove difficult.

A gripper of the first type may be found in U.S. Pat. No. 4,808,898, to Pearson, wherein a gripper system is disclosed in which a pair of fingers are operatively controlled by input signals. The fingers move opposite one another in parallel paths from an open position to a closed position. A motor and rack and pinion linkage are used to cause motion of the fingers. The drive shaft of the motor provides servo information. This type of gripper is best suited for large objects.

Grippers of the second type are disclosed in related U.S. Pat. Nos. 4,610,475 and 4,666,198, to Heiserman. Essentially, the grippers disclosed here are either based on a tweezers or pliers design. The grippers are actuated by piezo strips which cause either bending or pivoting of the mechanisms.

Given the above limitations with prior gripper designs, it is an object of the present invention to provide a compact micro-gripper with improved tactile sensitivity and parallel movement of its fingers.

It is another object of the present invention to provide a gripper with means for sensing a gripping force.

SUMMARY OF THE INVENTION

The above objects have been achieved by a gripper design which utilizes in combination a parallelogram spring attached to a lever. The lever has points about which the lever may flex, thereby eliminating problems with static friction. The lever is connected to an actuator means and to a free end of the parallelogram spring, so that transverse movement of the lever is translated into lateral movement of the free end of the spring. Opposite the free end of the spring is a fixed end which is attached to a support frame. A gripper finger may be attached to the free end of the spring. Typically a pair of springs and levers act in unison to manipulate a pair of fingers to grip or release an object, but only one combination of spring and lever is needed so long as there is an opposing support to work against.

The lever and spring are combined to overlay one another. That is, each lies in separate but parallel planes. Therefore, to balance the forces between the lever and spring, and to eliminate a tendency to twist, a sandwich-type design is used. Either two springs with a lever in between or two levers with a spring in between are used. This allows for a balanced application of force between the members. A sandwich-type arrangement is not necessary if there is sufficient lateral stiffness to the members.

Kinematically the arrangement of the lever and spring is constrained such that the lever has a flex point that generally coincides with an axis of rotation of the free end of the spring. Movement of a point on the free end is described by an arc having an axis of rotation. For the above arrangement of spring and lever to operate, the lever needs to have a flex point close to the axis of rotation of the free end of the spring.

Since the present invention is also concerned with providing micro-force control, the tips of the fingers used in the gripper may be provided with force sensing means. This is accomplished by forming in the tip of a finger a cantilever beam section which has an optical sensing means. The optical sensing means comprises a mirror attached to the beam section and which is positioned opposite a fiber optic cable. Light emitted from the fiber optic cable strikes the mirror and is fed back into the cable. As the cantilever beam bends, more or less of the mirror is presented to the fiber optic cable, so that more or less light is reflected back into the cable depending on the amount of force causing the beam to bend. In this way the gripping force may be determined over a range. The bending of the cantilever beam may also be detected visually by an operator, thereby giving the operator an indication of the amount of force applied. A microscope may aid in observing the deflections of the cantilever beam.

An advantage of the present invention is that the parallelogram springs provide parallel movement of the fingers. This gives the gripper the ability to grab objects having a range of sizes. Another advantage is that because the lever and spring flex rather than pivot, problems with sensitive tactile control due to static friction are virtually eliminated. Therefore, the force applied to an object can be varied infinitely over a range of values. Thus, very delicate procedures may be accomplished. Another important advantage is that the gripper of the present invention may be made very small.

BRIEF DESCRIPTION OF THE DRAWINGS

FIG. 1 is a front view of a gripper in accord with the present invention in an open position.

FIG. 1a is a detail view of an element of FIG. 1 shown in a flexed condition.

FIG. 2 is a view of the gripper of FIG. 1 in a closed position.

FIG. 2a is a detail view of an element of FIG. 2 shown in an unflexed condition.

FIG. 3 is a side view of an embodiment of the present invention.

FIG. 3a is a side view of a modified embodiment of FIG. 3.

FIG. 4 is a side view of another embodiment of the present invention.

FIG. 5 is a partial cross-sectional view of a fingertip in accord with the present invention showing an optical force sensing means.

FIG. 6 is an electrical schematic diagram illustrative of the force sensing means shown in FIG. 5.

BEST MODE FOR CARRYING OUT THE INVENTION

Referring to FIGS. 1 and 2, a micro-gripper assembly 10 is shown. The assembly has a support frame 12 and a bellows actuator 14. The bellows actuator includes a pressure vessel 15 and bellows 17. Air is pumped into and released from the pressure vessel through passageway 19. Other types of actuators may also be used, such as those involving piezoelectric material. The actuator 14 operates in conjunction with a lever 16 and a parallelogram spring 18 linkage, to open and close fingers 20 and 22. The bellows 17 is supported by the support frame 12, while the pressure vessel 15 is coupled to the lever 16 such that the pressure vessel moves relative to the support frame when there is a change in pressure within the pressure vessel.

The lever 16 may be manufactured from various metals using electrodischarge machining (EDM) techniques. EDM fabrication allows the parts of the present invention to have dimensions on the order of millimeters, with the overall length of the device less than one centimeter. Alternatively, molded plastics may be used. In addition, material and etching techniques known in the semiconductor industry may be employed to form the lever and other components of the assembly. This would enable very small assemblies, even smaller than a few millimeters, to be manufactured. FIGS. 1a and 2a show the lever 16 isolated from the other apparatus. The lever has three flex points 24, 26 and 28. Flex point 24 is fixed relative to the support frame 12. Flex points 26 and 28 act like pivot pins in a four-bar linkage. Thus, transverse motion of flex point 28 causes lateral movement of flex point 26. This movement is employed to cause the spring 18 to bend or straighten out.

Returning to FIGS. 1 and 2, the parallelogram spring 18 comprises a fixed end 30 attached to the support frame 12. Opposite the fixed end 30 is a free end 32. In between the fixed and free ends are two metal ribbons 34. The springs 18 may be made by any of the known metal working methods. In addition the springs may be made by molding plastic around metallic wire, with the plastic forming the fixed and free ends of the spring. A unique feature of parallelogram springs is that while the ribbons 34 bend, the ends remain parallel to one another. Thus when the levers 16, which are coupled to the free ends of the springs 18, are caused to move by the actuator 14, the free ends remain parallel to the fixed ends and move parallel to one another. Screws 36 or other means for attachment may be used to attach the fingers 20 and 22 to the free ends 32.

In assembling the lever and spring linkage the spring 18 is arranged so that it is in an unbent condition when the gripper is in a fully open position. The lever 16 on the other hand is in a flexed condition. However, when the gripper is fully closed, the lever 16 is in an unflexed condition, while the spring 18 is bent. Typically, the force of the spring will bias the gripper towards an open position. The actuator 14, when embodied as a bellows also acts as a spring. Therefore, it is possible to bias the assembly such that the neutral position of the gripper is open to a greater extent than possible with just the biasing force of the parallelogram spring. In fact the neutral position can be open to an extent past the neutral position of the parallelogram spring.

Turning to FIG. 3, an embodiment of the present invention is shown, wherein a spring 18 is sandwiched between two levers 16. The levers 16 act in unison and are both coupled to the free end of the spring. This arrangement allows for a balanced application of force to the spring via the levers. The levers 16 are coupled to the pressure vessel 15 via arms 21.

As discussed previously, a sandwich-type design is not necessary if the members are sufficiently stiff. FIG. 3a illustrates an assembly that has a single spring 18 and lever 16. Assemblies of this type may be more compact than the sandwich type.

Alternatively, as is shown in FIG. 4, a balanced force may also be applied by the arrangement of two springs 18 sandwiching a lever 16. This arrangement has the advantage that there are two fingers 20 which provide a wider area for gripping. Alternatively, the ends of the fingers 20 may come together to form a single tip.

FIG. 5 shows a tip of a finger 20 having a force-sensing means. The tip is formed with a cantilever beam section 40 to which is attached a mirror 42. The mirror is disposed opposite a fiberoptic cable 44, such that light emitted from the cable is reflected back into the end 46 of the cable 44 by the mirror 42. When no force is on the beam 40, the mirror 42 is presented to approximately one half of the area of the fiberoptic cable end 46. As force is applied to an object gripped by the finger, the beam is deflected such that more of the mirror is presented to the optical cable. This increases the amount of light reflected back to the cable.

FIG. 6 shows a schematic of the sensing means wherein an LED light source 50 is optically coupled to a fiberoptic cable 52 which directs the light to beam splitter 54. Part of the split beam is then carried by the fiberoptic cable 44 to the fingertip as described above in relation to FIG. 7. The light reflected by the mirror 42 is returned along cable 44 to beam splitter 54 wherein a part of the split beam is carried by fiberoptic cable 56 to a photodetector 58. The photodetector 58 converts the light energy received into a voltage that is fed into operational amp 60 which produces an output voltage, $v_{out}$. The output signal, $v_{out}$, can be calibrated to represent the amount of force applied to the cantilevered beam section 40 of the fingertip. In this way, the force applied to an object in the gripper can be accurately measured and controlled.

The embodiments shown and described above are intended to be illustrative only. It will be appreciated by those skilled in the art that other embodiments are possible and are within the scope of the invention.

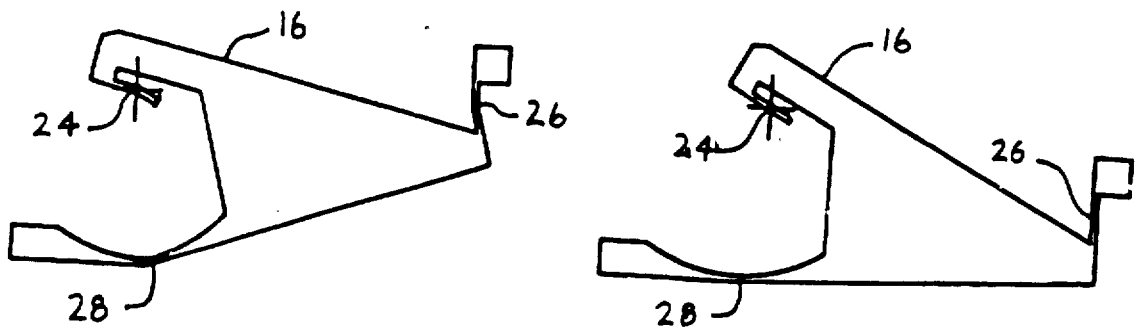
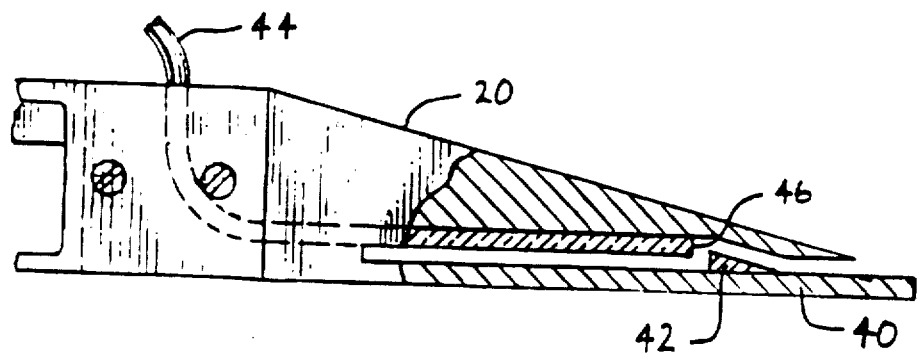
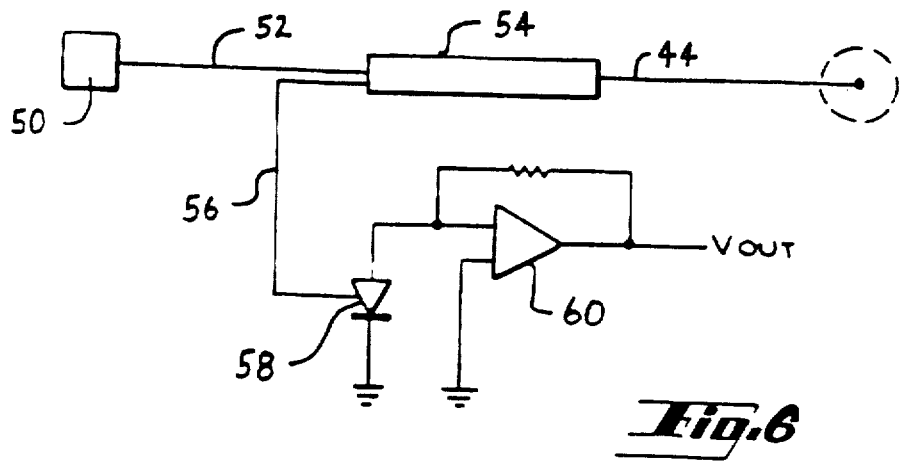

I claim:

1. A micro-gripper assembly comprising:
a first parallelogram spring mechanism having a free end and having an opposing fixed end coupled to a support frame, the free end transcribing an arc about an axis of rotation and remaining generally parallel to the fixed end;
a first flexural lever coupled to the parallelogram spring mechanism near said free end, the flexural lever having a substantially fixed flex point generally coinciding with said axis of rotation, and having an end coupled to said support frame;
actuator means coupled to the lever for causing said flexural lever to bend at the substantially fixed flex point, whereby said free end of the parallelogram spring mechanism follows the motion of said flexural lever while remaining generally parallel to the fixed end.

2. The micro-gripper of claim 1 further comprising a finger mount located at said free end.

3. The micro-gripper of claim 2 further comprising a deformable finger indicative of a force applied to the finger, the deformable finger being coupled to said finger mount.

4. The micro-gripper of claim 3 further comprising a stationary support arranged such that said free end and said stationary support provide a gripping and releasing action.

5. The micro-gripper of claim 1 wherein said actuator means comprises a bellows device.

6. A micro-gripper assembly comprising:
a support frame;
actuator means mounted to the support frame for causing motion relative to the support frame;
a first pair of co-planar flexural levers with each lever having a plurality of flex points with one flex point being a fulcrum substantially fixed relative to the support frame, each lever being mounted to the support frame and coupled to the actuator means such that the levers cooperatively bend at respective fulcrums in opposite directions when acted upon by the actuator means;
a first pair of co-planar parallelogram springs with each spring having a fixed end mounted to the support frame and having a free end opposite the fixed end, the free end transcribing an arc about an axis of rotation, each parallelogram spring being coupled near the free end to one of the levers, and being arranged and linked together such that the axis of rotation of the free end generally corresponds to the fixed fulcrum of the lever, each lever and spring linkage acting cooperatively to provide parallel motion of the free ends; and
means for mounting a finger to the free end of each spring.

7. The micro-gripper of claim 6 further comprising a second pair of co-planar parallelogram springs arranged parallel to and coinciding with said first pair of springs, said first pair of levers being disposed between said first and second pair of springs.

8. The micro-gripper of claim 7 further comprising a second pair of co-planar levers arranged parallel to and coinciding with said first pair of levers, said first pair of springs being disposed between said first and second pair of levers.

9. The micro-gripper of claim 6 further comprising a deformable finger indicative of a force applied to the finger, the deformable finger being coupled to said finger mount.

10. The micro-gripper of claim 6 wherein said actuator means comprises a bellows device.

11. A tactile micro-gripper system comprising:
a support frame;
actuator means mounted to the support frame for causing motion relative to the support frame;
a pair of levers with each lever having a plurality of flex points with one flex point being substantially fixed relative to the support frame, each lever being mounted to the support frame and coupled to the actuator means such that the levers cooperatively flex in opposite directions when acted upon by the actuator means;
a pair of parallelogram springs with each spring having a fixed end mounted to the support frame and having a free end opposite the fixed end, the free end transcribing an arc about an axis of rotation, each parallelogram spring being coupled near the free end to one of the levers and being arranged together such that the axis of rotation of the free end generally corresponds to the fixed flex point of the lever;
a pair of fingers coupled to the free ends of the springs, at least one of the fingers capable of tactile sensing by having a cantilever beam section with a mirror attached thereto, the tactile sensing finger further having a fiberoptic carrier disposed within the finger in optical communication with said mirror, the fiberoptic carrier and the mirror cooperating in such a manner that flexures of the cantilever beam change the area of the mirror that is presented to the fiberoptic carrier;
a light source disposed in light coupling relation with the fiberoptic carrier for directing light to the mirror; and
optical means for receiving light returned from the mirror and for directing a portion of the returned light to a photodetector, the photodetector converting light energy into a signal that is representative of the force applied to the cantilever beam.

12. The system of claim 11 wherein said optical means is a beam splitter.

13. A tactile sensing finger for use with robotic grippers comprising:
a finger body having a tip portion with a gripping surface;
the gripping surface including a cantilever beam bendable upon application of a gripping force;
a mirror attached to the cantilever beam opposite the gripping surface;
a fiberoptic carrier disposed within the finger member with an end in a juxtaposed but offset relation to the mirror;
a light source disposed in light coupling relation with the fiberoptic carrier for directing light to the mirror;
wherein the fiberoptic carrier and the mirror cooperate such that bending of the cantilever beam changes the intensity of the reflected light that is presented to the fiberoptic carrier; and
a beam splitter for splitting light returned from the mirror to the fiberoptic carrier, and for directing a portion of the split beam to a photodetector, the photodetector converting light intensity into a voltage that is representative of the force applied to the cantilever beam.

14. A micro-gripper assembly comprising:
a first parallelogram spring mechanism having a free end and having an opposing fixed end coupled to a support frame, the free end transcribing an arc about an axis of rotation and remaining generally parallel to the fixed end;
a first lever coupled to the first parallelogram spring mechanism near said free end, the lever having a flex point generally coinciding with said axis of rotation, and having an end fixed to said support frame;
a second parallelogram spring mechanism arranged parallel with said first parallelogram spring mechanism and having an axis of rotation coinciding with said axis of rotation of said first parallelogram spring mechanism, said first lever being between said first and second parallelogram spring mechanisms and being coupled to the free ends thereof; and actuator means coupled to the lever for causing said lever to flex, whereby said free ends of the first and second parallelogram spring mechanisms follow the motion of said lever.

15. A micro-gripper assembly comprising:

a first parallelogram spring mechanism having a free end and having an opposing fixed end couple to a support frame, the free end transcribing an arc about an axis of rotation and remaining generally parallel to the fixed end;

a first lever coupled to the parallelogram spring mechanism near said free end, the lever having a flex point generally coinciding with said axis of rotation, and having an end fixed to said support frame;

a second lever arranged parallel with said first lever and having a flex point coinciding with the flex point of said first lever, said first parallelogram spring mechanism being between said first and second levers and being coupled to both levers; and actuator means coupled to the levers for causing said levers to flex, whereby said free end of the parallelogram spring mechanism follows the motion of said levers.

* * * * *

UNITED STATES PATENT AND TRADEMARK OFFICE
CERTIFICATE OF CORRECTION

PATENT NO. : 5,046,773

DATED : September 10, 1991

INVENTOR(S) : D. Bruce Modesitt

It is certified that error appears in the above-identified patent and that said Letters Patent is hereby corrected as shown below:

In the Drawings:

Sheet 3 of 3 was omitted from the parited patent.

Signed and Sealed this

Tenth Day of May, 1994

Attest:

BRUCE LEHMAN

Attesting Officer

Commissioner of Patents and Trademarks